United States Patent [19]

Schroderus

[11] Patent Number: 5,943,326
[45] Date of Patent: *Aug. 24, 1999

[54] SYNCHRONIZING A TELECOMMUNICATION CONNECTION IN A MOBILE COMMUNICATION SYSTEM

[75] Inventor: Osmo Schroderus, Sumiainen, Finland

[73] Assignee: Nokia Telecommunications OY, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/716,375

[22] PCT Filed: Jan. 18, 1996

[86] PCT No.: PCT/FI96/00040

§ 371 Date: Sep. 19, 1996

§ 102(e) Date: Sep. 19, 1996

[87] PCT Pub. No.: WO96/22635

PCT Pub. Date: Jul. 25, 1996

[30] Foreign Application Priority Data

Jan. 19, 1995 [FI] Finland ..................................... 950234

[51] Int. Cl.$^6$ ..................................................... H04J 3/06
[52] U.S. Cl. ............................................. 370/324; 370/350
[58] Field of Search ....................................... 370/315, 316, 370/319, 321, 322, 323, 324, 326, 327, 328, 336, 337, 345, 347, 348, 350; 455/422, 424, 425, 502, 507, 515, 517

[56] References Cited

U.S. PATENT DOCUMENTS

| | | | |
|---|---|---|---|
| 5,258,980 | 11/1993 | Maebara et al. | 370/347 |
| 5,293,380 | 3/1994 | Kondo | 370/337 |
| 5,369,683 | 11/1994 | Yabe et al. | 455/455 |
| 5,404,575 | 4/1995 | Lehto | 455/502 |
| 5,410,588 | 4/1995 | Ito | 455/502 |
| 5,440,561 | 8/1995 | Werronen | 370/337 |
| 5,537,685 | 7/1996 | Matsuno | 455/502 |
| 5,561,846 | 10/1996 | Hagio | 370/337 |
| 5,613,211 | 3/1997 | Matsuno | 455/502 |

FOREIGN PATENT DOCUMENTS

| | | |
|---|---|---|
| 3 203 678 | 8/1983 | Germany . |
| 2 285 723 | 7/1995 | United Kingdom . |
| 2 290 677 | 1/1996 | United Kingdom . |

*Primary Examiner*—Chi H. Pham
*Assistant Examiner*—Kwang B. Yao
*Attorney, Agent, or Firm*—Pillsbury Madison & Sutro LLP

[57] ABSTRACT

A method for synchronizing a telecommunication connection in a mobile communication system, in which method a repeater station receives a connection set-up request for establishing a telecommunication connection from a mobile station communicating on a direct mode channel to the mobile communication system, and in which the repeater station receives traffic channel information concerning on which traffic channel of the mobile communication system the telecommunication connection to be established must be established. In the method, the repeater station notifies the mobile stations communicating on the direct mode channel, on the basis of the traffic channel information, of synchronization information concerning the adaptive synchronization to be used over the telecommunication connection to be established on the direct mode channel, and that a mobile station shifts the starting moment of a frame of its own direct mode channel transmission in relation to the starting moment according to the basic synchronization in accordance with the adaptive synchronization indicated in the synchronization information notified by the repeater station.

19 Claims, 5 Drawing Sheets

SYNCHRONIZING A TELECOMMUNICATION CONNECTION IN A MOBILE COMMUNICATION SYSTEM

This application claims benefit of international application PCT/FI96/00040, filed Jan. 18, 1996.

FIELD OF THE INVENTION

The present invention relates to a method for synchronizing a telecommunication connection in a mobile communication system, which comprises at least one base station, which communicates on control and traffic channels of the mobile communication system, the uplink and downlink frequencies of said channels being divided into frames containing time slots; at least one mobile station communicating on a direct mode channel divided into frames containing time slots, which mobile station has synchronized its transmission with a basic synchronization converging with the synchronization of a control channel of the base station; a repeater station, which forwards traffic between mobile stations communicating on the direct mode channel and the base station; in which method the repeater station receives a connection set-up request for establishing a telecommunication connection from a mobile station communicating on the direct mode channel to the mobile communication system, and in which the repeater station receives traffic channel information concerning on which traffic channel of the mobile communication system the telecommunication connection to be established must be established.

BACKGROUND OF THE INVENTION

The present invention relates to the field of mobile telephone systems. A subscriber in a mobile telephone system, i.e. a subscriber station, for instance a radio telephone or a mobile station, may be registered in a radio network or a radio system, whereby it is connected to the radio network via system channels comprising control and traffic channels maintained by the base stations of the radio network.

In addition to the system channels provided in mobile phone systems, so-called direct mode channels can also be used in connection with a radio system, i.e. direct mode operation is applied. Subscriber stations using direct mode operation do not communicate directly with the radio network or its base stations. Direct mode channels are frequencies at which mobile phones or other means of communication are able to communicate directly with one another without the system, or via repeater stations, either with the base stations of the system or with other mobile stations.

Direct mode channels are typically used in situations where for instance a group of portable mobile phones are communicating with one another at such a long distance from the base station that system channels cannot be used.

Another important way of using direct mode channels is to increase the capacity when the traffic in the system increases rapidly, e.g., due to occurrence of an incident in some part of the service area of the system, for instance in some point-like part.

A direct mode channel is referred to with the terms direct or simplex channel, or a simplex connection. A direct mode channel is a channel which is typically not at all used by the system. It may be, for instance a channel with the same channel spacing as the channels of the system, for instance 12.5 kHz or 25 kHz. Among the mobile phones operating on a direct mode channel, the transmitting station has tuned its transmitter to the direct mode channel and transmits speech or data information. The other mobile phones set to direct mode operation have tuned their receivers to the same direct mode channel, whereby they are able to directly hear the transmission.

Operation on a direct mode channel may take place on an analog or digital modulation principle. A mobile phone transmitting on the channel may also transmit signalling information, such as information on rights of use and priorities or on a group operating on the channel, or data traffic. On the direct mode channel, an encryption may be carried out or plain speech can be transmitted.

Subscriber stations using direct mode operation communicate with other subscriber stations on a direct mode channel without being in direct contact with the base stations of the radio network. The subscriber stations using direct mode operation can, however, communicate with the radio network via repeater stations. A repeater station is a piece of equipment comprising two radio apparatuses connected to each other. The repeater station typically comprises two transceivers. The repeater station transmits the information messages transmitted on the direct mode channel to desired network elements, for instance to the base stations of the radio network, these base stations transmitting the information messages further to the switching centers of the radio network. The information messages forwarded by the repeater station may be, for instance speech or data or signalling messages. In using a repeater, the traffic on the direct mode channel takes place, for instance on a semiduplex principle.

It should be noticed that, in direct mode operation, repeaters/repeater stations may also forward traffic between two mobile stations located within the coverage area of the repeater concerned, the mobile stations not being necessarily located within the coverage area of each other. A repeater may also act as a gateway between a mobile communication system, especially a base station thereof, and mobile stations communicating on the direct mode channel.

In prior art solutions, mobile stations communicating on a direct mode channel communicate on the direct mode channel in every situation in such a manner that the transmissions of the mobile stations are synchronized to be simultaneous with the downlink transmissions on a control channel maintained by a base station. A solution of the prior art causes delays of different lengths to signalling and speech messages transmitted between the direct mode channel and the system channel. The delays are naturally undesirable when considering the speed requirements of the connections to be established, and the delays also deteriorate the quality of the speech to be forwarded. In addition, the control of such delays renders a repeater station more complicated, and worse as regards the properties thereof, since long-term buffering of the transmitted information is required. An especially harmful feature is that call set-up times are prolonged as a result of the delays. The call set-up times are crucial, for instance in PMR mobile telephone systems (PMR=Private Mobile Radio), the users of which probably consist of authorities engaged in emergency duties, who require fast call set-up.

SUMMARY OF THE INVENTION

The object of the present invention is to implement a method and a repeater station by means of which the problems associated with the solutions of the prior art can be solved.

The object of the invention is also to reduce or remove delays which are produced when a mobile station communicating on a direct mode channel is communicating and establishing a connection with a base station of the mobile communication system via a repeater station.

This new type of method for establishing a telecommunication connection is achieved with the method of the invention, characterized in that the repeater station notifies the mobile stations communicating on the direct mode channel, on the basis of the traffic channel information, of synchronization information concerning the adaptive synchronization to be used over the telecommunication connection to be established on the direct mode channel, and that a mobile station shifts the starting moment of a frame of its own direct mode channel transmission in relation to the starting moment according to the basic synchronization in accordance with the adaptive synchronization indicated in the synchronization information notified by the repeater station.

The present invention also relates to a mobile communication system which comprises at least one base station, which communicates on control and traffic channels of the mobile communication system, the uplink and downlink frequencies of the channels being divided into frames containing time slots; at least one mobile station communicating on a direct mode channel divided into frames containing time slots, which mobile station has synchronized its transmission with a basic synchronization converging with the synchronization of the control channel of the base station; a repeater station, which forwards traffic between mobile stations communicating on the direct mode channel and the base station, the repeater station comprising a first receiver unit for receiving radio messages from the base station; a second receiver unit for receiving radio messages from mobile stations communicating on the uplink channel of the direct mode channel; a control unit for controlling the operation of the receiver units and the repeater station; at least one transmitter unit for transmitting radio messages in response to commands given by the control unit selectively at least to the base station and to a mobile station communicating on the direct mode channel.

The mobile communication system of the invention is characterized in that the repeater station is arranged to notify the mobile stations communicating on the direct mode channel, on the basis of the traffic channel information allocated to the telecommunication connection to be established, of synchronization information concerning the adaptive synchronization to be used over the telecommunication connection to be established on the direct mode channel, the mobile station being arranged to shift, in response to the synchronization information, the starting moment of its own direct mode channel transmission in relation to the starting moment according to the basic synchronization in accordance with the adaptive synchronization indicated in the synchronization information notified by the repeater station.

The invention further relates to a mobile station communicating on a direct mode channel divided into frames containing time slots, which mobile station has synchronized the starting moment of the frame of its direct mode channel transmission with a basic synchronization converging with the synchronization of a control channel of a base station, the mobile station comprising a memory means; a transceiver, which is arranged to transmit the transmissions of the mobile station; and a control unit for controlling the operation of the mobile station.

The mobile station of the invention is characterized in that the mobile station is arranged to shift, in response to the synchronization information obtained from a repeater station, the starting moment of a frame of its own direct mode channel transmission in relation to the starting moment according to the basic synchronization in accordance with the adaptive synchronization indicated in the synchronization information notified by the repeater station.

The invention further relates to a repeater station which forwards traffic between mobile stations communicating on a direct mode channel and a base station of a mobile communication system, the repeater station comprising a first receiver unit for receiving radio messages from the base station; a second receiver unit for receiving radio messages from mobile stations communicating on the direct mode channel; a control unit for controlling the operation of the receiver units and the repeater station; at least one transmitter unit for transmitting radio messages in response to commands given by the control unit selectively at least to the base station and to a mobile station communicating on the direct mode channel.

The repeater station of the invention is characterized in that the repeater station is arranged to notify the mobile stations communicating on the direct mode channel, on the basis of the traffic channel information allocated to the telecommunication connection to be established, of synchronization information concerning the adaptive synchronization to be used over the telecommunication connection established on the direct mode channel, the mobile station being arranged to shift, in response to the synchronization information, the starting moment of its own direct mode channel transmission in accordance with the adaptive synchronization indicated in the synchronization information notified by the repeater station.

The invention is based on the idea that the starting of the transmission of mobile stations operating on direct mode channels is adapted to the system channels of the base station of the mobile communication system so that no unnecessary delays are produced. The repeater station of the invention operates in such a manner that the repeater station notifies, on the basis of the traffic channel/time slot allocated by the mobile communication system, an adaptive synchronization which is new in comparison with the basic synchronization of the direct mode channel to a mobile station, which communicates on the direct mode channel via the repeater station with a base station of the mobile communication system. In this context, the basic synchronization refers to a synchronization valid on the direct mode channel at a given moment.

According to the invention, the mobile stations operating on the direct mode channel under the repeater station are adaptively synchronized with system channels maintained by a base station of a mobile communication system, especially the TETRA (Trans European Trunked Radio System) mobile communication system.

An advantage of the method and the repeater of the invention is that the invention enables operation in a direct mode channel—system channel environment in such a manner that as few delays as possible are produced in communicating via the repeater station. The delays produced are also kept to the minimums thereof, irrespective of the location of the system channels with respect to the direct mode channel.

An advantage of the method of this type of invention is that its use enables the operation of mobile stations on a direct mode channel under the repeater station in a gateway-type system connection by simultaneously providing the repeater station with a possibility to operate as a repeater with respect to other mobile stations operating on the direct mode channel. In this context, a gateway-type connection refers to the connection of two different types of channels, for instance a direct mode channel and a system channel. The repeater-type facility refers to the repetition of the transmissions of mobile stations operating on a direct mode channel to other mobile stations operating on the direct mode channel.

Another advantage of the invention is that the repeater station can be implemented as comprising one transmitter, whereby the repeater is more advantageous than a conventional repeater, which comprises two transceivers.

A further advantage of the invention is that the repeater station can provide a repeater-type service and gateway-type service simultaneously, by using one transmitter and two receivers.

Yet another advantage of the invention is that it also enables simultaneous direct mode channel—system channel (gateway) and direct mode channel—direct mode channel (repeater) type facility by means of one apparatus, by using an economically advantageous structure in the repeater station, for instance in such a manner that no unnecessary buffers are required in the repeater.

BRIEF DESCRIPTION OF THE DRAWINGS

In the following, the invention will be described in more detail with reference to the accompanying drawings in which.

DETAILED DESCRIPTION OF A PREFERRED EMBODIMENT OF THE INVENTION

Figure 1:
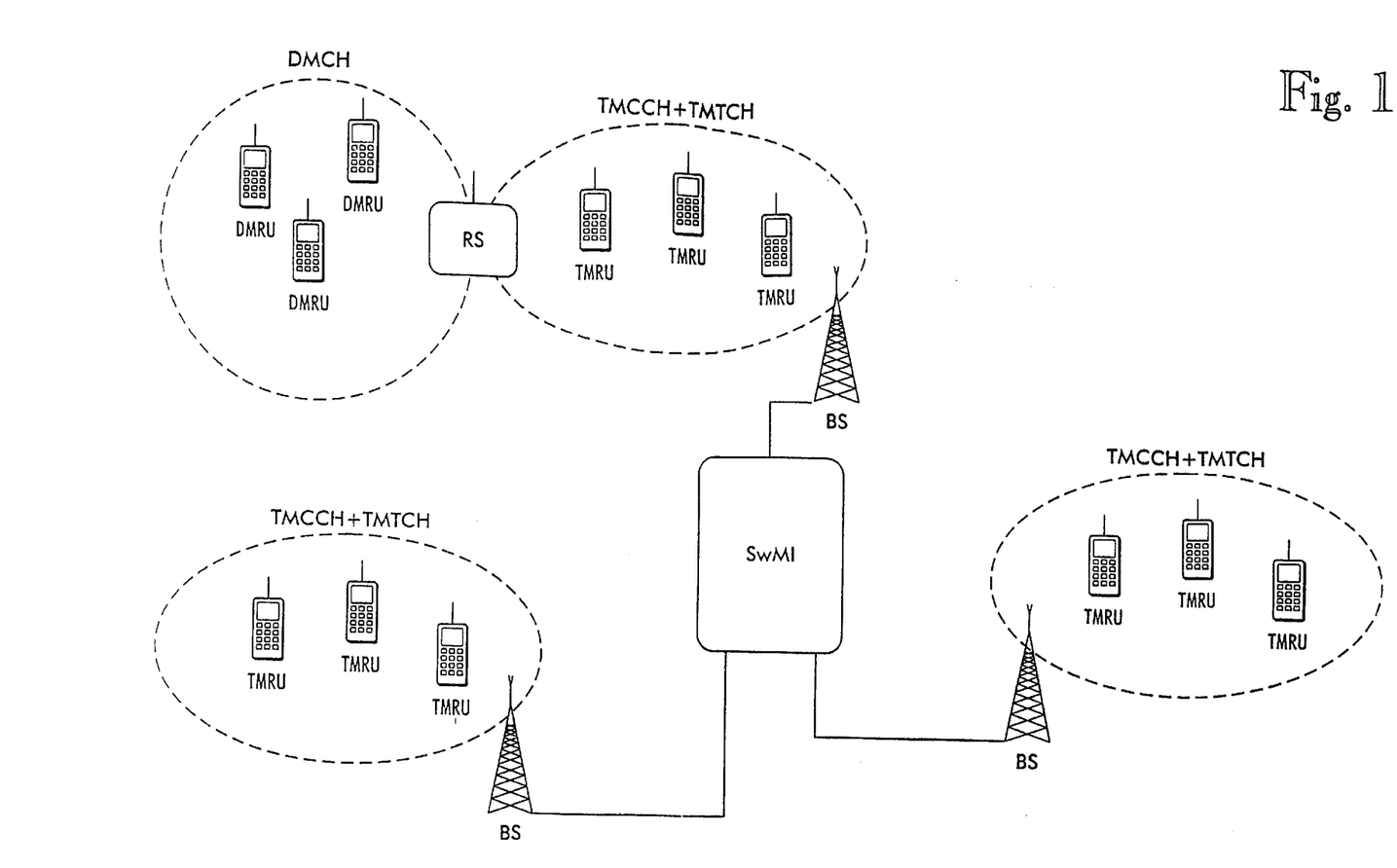
FIG. 1 shows a block diagram of a mobile communication system in which the repeater of the invention is used.

FIG. 1 shows a block diagram of a mobile communication system in which the repeater of the invention is used. The mobile communication system includes mobile stations DMRU (Direct Mode Radio Unit) operating under a repeater station RS; mobile stations TMRU (Trunking Mode Radio Unit) operating on system channels TMCCH (Trunking Mode Control Channel), TMTCH (Trunking Mode Traffic Channel); a repeater station RS; a direct mode channel DMCH; system channels TMCCH and TMTCH; base stations BS; and a system SwMI (Switching and Management Infrastructure). The repeater station operates both on the direct mode channel DMCH and on the system channels TMCCH and TMTCH. The system SwMI consists, for instance of the switching center of the mobile communication system, data transmission equipment, and an operation and maintenance center. The invention relates particularly to the mobile stations DMRU operating on the direct mode channel DMCH and to the repeater RS, which connects these mobile stations to a base station BS of the mobile communication system.

Figure 2:
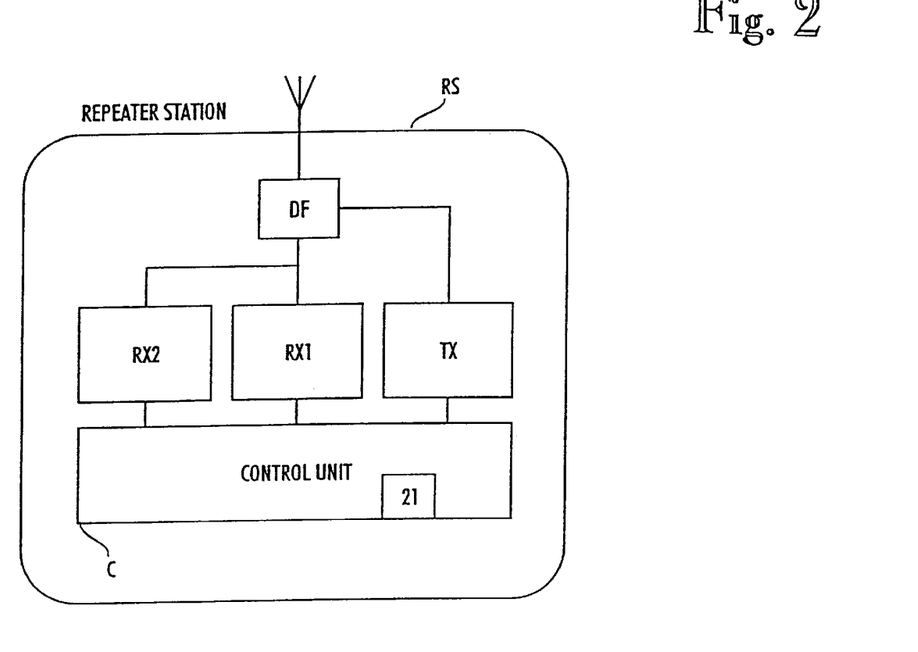
FIG. 2 shows a block diagram of the repeater of the invention.

FIG. 2 shows a block diagram of the repeater of the invention. The repeater station, or briefly, the repeater, consists of the following parts: a receiver RX2 for receiving the transmissions of the direct mode channel; a receiver RX1 for receiving the transmissions of the system channels; a transmitter TX for transmitting the transmissions of the direct mode channel and of the system channels; and a control section controlling the operation of the entire repeater station. The repeater may also comprise a possible duplex filter DF. The repeater station RS of the invention is arranged to notify the mobile stations communicating on the direct mode channel, on the basis of the traffic channel information allocated to the telecommunication connection to be established, of synchronization information concerning the adaptive synchronization to be used over the telecommunication connection to be established on the direct mode channel, the mobile station being arranged to shift, in response to the synchronization information, the starting moment of its own direct mode channel transmission in accordance with the adaptive synchronization indicated in the synchronization information sent by the repeater station.

Furthermore, the repeater station of the invention comprises means 21 for transmitting the synchronization information to the mobile stations operating on the direct mode channel, the synchronization information indicating the adaptive synchronization to be used on the established telecommunication connection.

Figure 3:
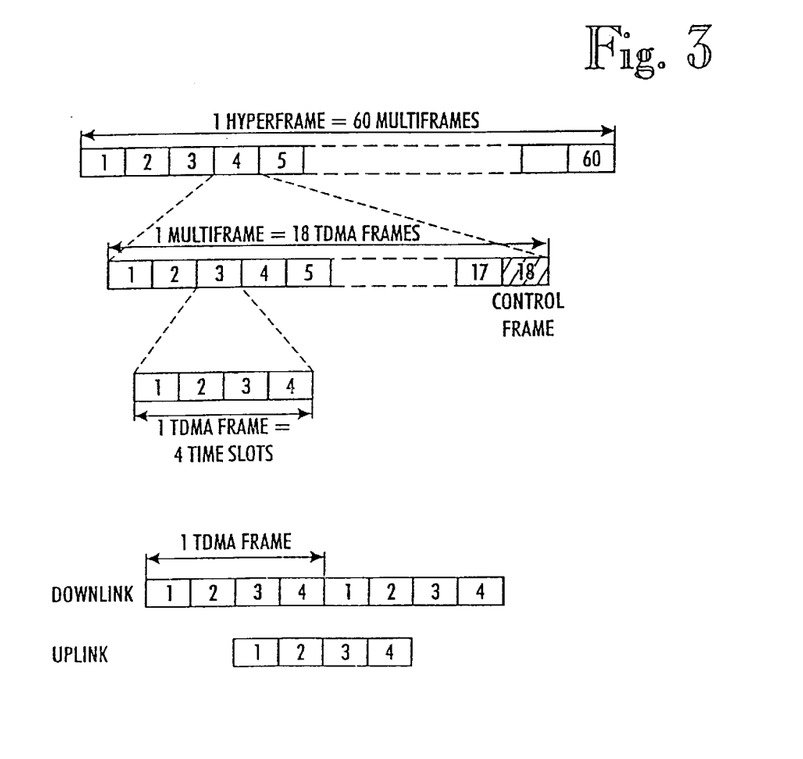
FIG. 3 shows the frame structure of the TETRA mobile communication system.

FIG. 3 shows the frame structure of the TETRA mobile communication system. In the TETRA system, the uplink frequency, i.e. the reverse direction frequency, that is, the direction from a mobile station to a base station (RU→BS) has been delayed by two time slots on the system channels as compared with the downlink frequency, i.e. the codirectional frequency, that is, the direction from a base station to a mobile station (BS→RU). A direct mode channel is also divided physically in the same manner into frames and time slots; however, only one frequency is used at which communication takes place in both directions.

Figure 4:
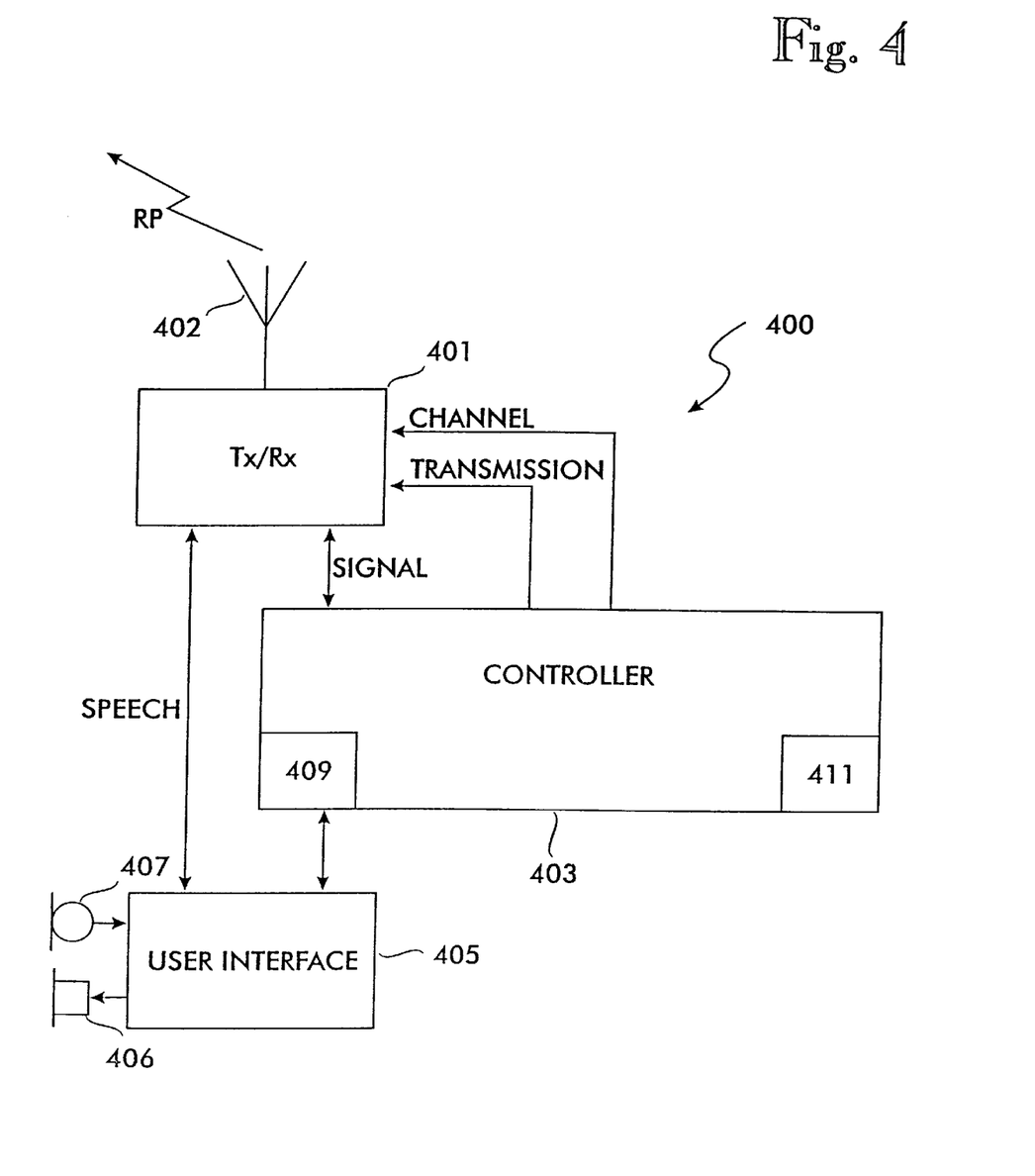
FIG. 4 shows a block diagram of a mobile station according to the invention, operating on a direct mode channel.

FIG. 4 shows a block diagram of a mobile station according to the invention, operating on a direct mode channel. FIG. 4 shows a typical radio unit 400 communicating on a direct mode channel, i.e. a radio telephone used by a subscriber, mobile station, or for instance a subscriber station. The purpose of a transceiver (TX/RX) 401 is to tune to the radio channel used in each particular case. An antenna 402 is connected with the transceiver 401, this antenna being connected with the radio path RP. Radio frequencies in the range of 60 to 1000 MHz (VHF and UHF ranges) are usually used, even though other frequencies can also be used. On the radio path RP, analog modulation can be used, the modulation usally being phase modulation. Other kinds of modulation can also be used. Signalling can be transmitted, e.g. by a voice-frequency subcarrier (FFSK). Transmission on the radio path can also be digital. The radio unit can adapt to and communicate on a direct mode channel.

A user interface 405 comprises electroacoustic transducing means, typically a headphone 406 and a microphone 407, and optionally buttons for starting and ending a call, and for dialling. Since in a trunking system, and especially on a direct mode channel, transmission on the radio path RP is advantageously unidirectional, the user interface usually also has a push-to-talk button that must be depressed when transmitting. The push-to-talk button is not shown in FIG. 4.

The task of a control unit 403 is to control the operation of the radio unit. The control unit 403 is connected with the user interface 405, from which it receives impulses, e.g. for starting and ending a call. The control unit 403 may also give the user, via the user interface 405, voice or visual signals that relate to the operation of the radio phone and/or the radio telephone system.

The control unit 403 is connected with the transceiver TX/RX 401. The channel employed by the transceiver is determined by the control unit 403, i.e. the transceiver 401 tunes to the channel determined by the control unit 403, i.e. to a radio frequency and a suitable time slot. The radio unit of the invention is able to tune to a direct mode channel. The transceiver 401 is also switched on by the control unit 403. The control unit 403 receives and transmits signalling messages via the transceiver 401. The radio unit of the invention operating on a direct mode channel, i.e. the mobile station 400, is intended to be used for instance in a radio system comprising a radio network with at least one base station and subscriber stations and possibly one or more repeater stations, which forward traffic between at least one base station and subscriber stations operating on the direct mode channel. The mobile station operating on the direct mode channel thus comprises a memory means 411, a transceiver 401, and a control unit 403 for controlling the operation of the mobile station.

The mobile station 400 of the invention is arranged to shift, in response to the synchronization information obtained from the repeater station, the starting moment of a frame of its own direct mode channel transmission in relation to the starting moment according to the basic synchronization in accordance with the adaptive synchronization indicated in the synchronization information notified by the repeater station.

The mobile station of the invention comprises means 409 responsive to a command given by the repeater station for shifting the starting moment of a frame of the direct mode channel transmission of the mobile station in relation to the starting moment according to the basic synchronization in accordance with the adaptive synchronization indicated in the synchronization information sent by the repeater station.

The mobile station of the invention is further arranged to store in the memory thereof the synchronization information received from the repeater station, the synchronization information indicating the starting moment of a frame according to the adaptive synchronization in comparison with the starting moment of a frame according to the basic synchronization.

Figure 5:
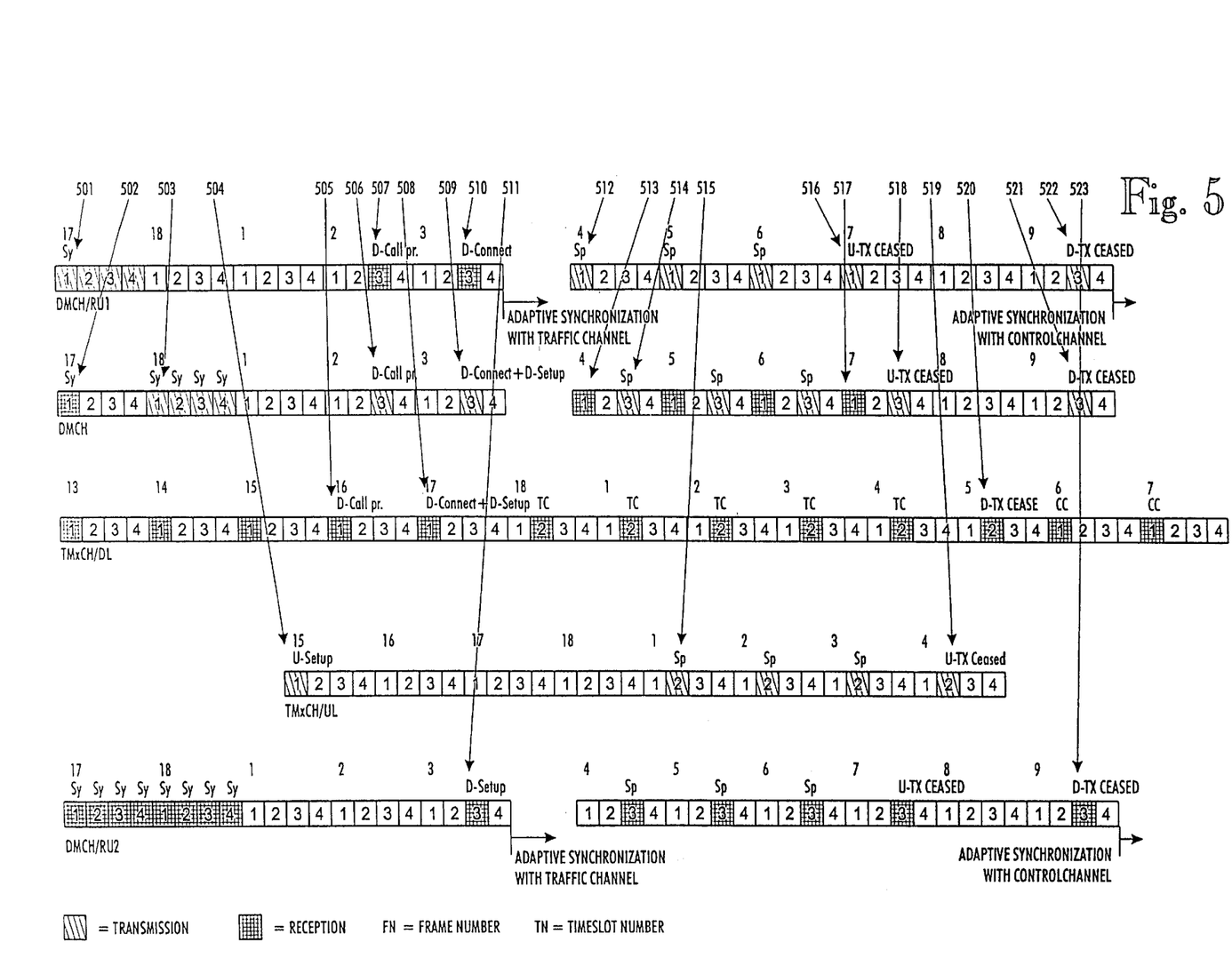
FIG. 5 shows a frame structure figure of the operation of the method of the invention when a telecommunication connection to the mobile communication system is activated from a mobile station operating on a direct mode channel.
Figure 6:
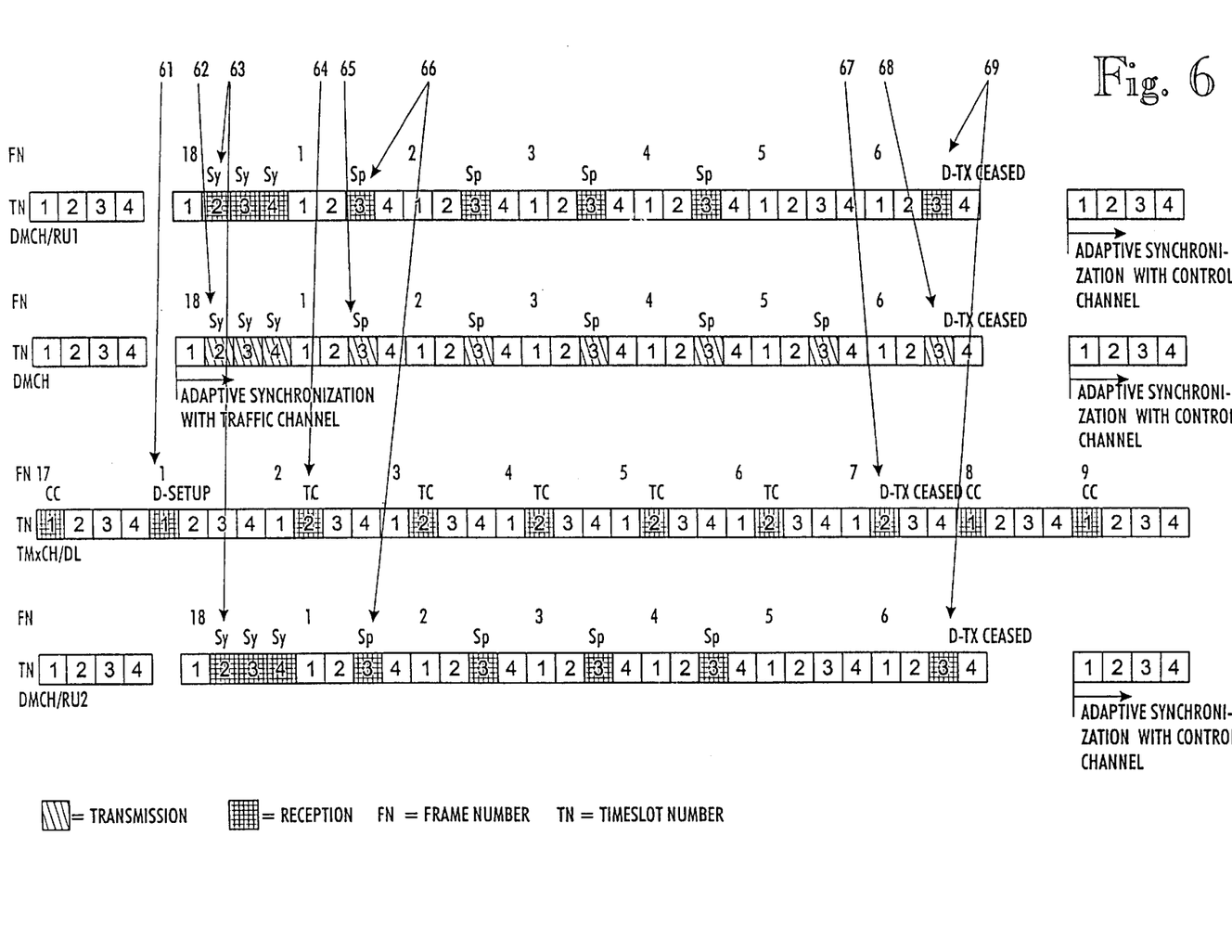
FIG. 6 shows a frame structure figure of the operation of the method of the invention when a telecommunication connection to the mobile communication system is activated from the mobile communication system.

FIG. 5 shows a frame structure figure of the operation of the method of the invention when a telecommunication connection to the mobile communication system is activated from a mobile station operating on a direct mode channel. In FIGS. 5 and 6, oblique strokes are used for indicating the time slots in which transmission takes place, and checkering is used for indicating the time slots in which reception takes place. Reference FN indicates the frame numbers 1–18 of the frame structure of the TETRA system, and reference TN indicates the time slot numbers 1–4. Reference U indicates the uplink direction and reference D indicates the downlink direction. Reference CC indicates a calling or a control channel and reference TC indicates a traffic channel. In FIG. 5, a mobile station DMCH/RU1 located on a direct mode channel activates a telecommunication connection, in this case a group call, via the repeater RS by transmitting a connection set-up request 501 in time slot 1 and repeating it in time slots 2–4. The repeater station receives a connection set-up request 502 in time slot 1 and repeats it to the direct mode channel in time slots 1–4 of the next frame (reference numeral 503). The repeater station transmits 504 the connection set-up request further to the system by using the normal connection set-up procedure of the TETRA. In response to the connection set-up request 504 (U-Setup) of the repeater station, the system may transmit a temporary acknowledgement 505 (D-Call pr.), which is forwarded 506 further to a direct mode channel, on which the mobile station receives 507 it. When the system has established the resources necessary for the required telecommunication connection as regards the mobile stations in the system, it transmits a final acknowledgement 508, which the repeater station forwards 509 further to the direct mode channel. The final acknowledgement consists of two separate parts: a message 510 (D-Connect) addressed to the mobile station which had requested the telecommunication connection, and a message 511 (D-Setup) addressed to the other parties of the group call. The final acknowledgement indicates to the receivers the detailed information on the established telecommunication connection, i.e. what the established traffic channel is.

The following is a description of the operation of the method in an established telecommunication connection. After having received the final telecommunication connection set-up acknowledgement 510 or 511 described above, the mobile stations operating on the direct mode channel adapt to the traffic channel established according to the invention in such a manner that after having received the transmission 512 of the mobile station in time slot 1 (reference numeral 513), the repeater station may use one time slot for processing the transmission and transmit it further to the direct mode channel in time slot 3 (reference numeral 514), and finally transmit it to the system 515. As regards the mobile stations on the direct mode channel, the adaptation thus means the positioning of the beginning of time slot 1 so as to coincide with an uplink time slot of the traffic channel. This chain of events 512, 513, 514, 515 is repeated until the caller ends 516 the telecommunication connection by a message U-TX Ceased.

The following is a description of the procedure in connection with ending a telecommunication connection. When the caller ends the established telecommunication connection by transmitting a notification 516 (U-TX Ceased), the repeater station receives 517 it, and transmits 518 it further to the direct mode channel and to the system 519. The system acknowledges 520 the end of the connection, the repeater station then transmits 521 the acknowledgement further to the direct mode channel, on which it is received by both the requester 522 of the telecommunication connection and the other parties 523 of the group call. After having received the acknowledgement, the mobile stations communicating on the direct mode channel readapt to the control channel of the system by operating in subsequent telecommunication connections in such a manner that the starting moment of a frame is adapted in relation to the starting moment according to the basic synchronization to be in accordance with the adaptive synchronization indicated in the synchronization information notified by the repeater station, in such a manner that data transmission from the direct mode channel to a traffic channel of the base station via the repeater station takes place with as few delays as possible. As regards the mobile stations of the direct mode channel, the adaptation means, for instance positions the beginning of time slot 1 to coincide with a downlink time slot of the control channel.

FIG. 6 shows a frame structure figure of the operation of the method of the invention when a telecommunication connection to the mobile communication system is activated from the mobile communication system. The same general reference numerals and time slot coloring as in FIG. 5 are applied in FIG. 6. The following is a description of the operation of the invention during telecommunication connection establishment when the system activates a telecommunication connection, in this case a group call, via the repeater by transmitting a notification 61 of a connection set-up. The repeater station adapts to the traffic channel to be established by timing the traffic on the direct mode channel in such a manner that the time slot 3 of the direct mode channel is in the middle of two successive received traffic channel downlink time slots. After having adapted in this manner, the repeater station transmits a notification of the connection set-up to the direct mode channel by repeating 62 it in the next frame in so many time slots as is possible as regards the established traffic channel. The mobile stations operating on the direct mode channel hear the transmission 63 of the repeater station, and activate and adapt to the established connection. The repeater station receives the speech transmitted by the system from the system channel 64 and transmits it further to the direct mode channel in time slot 3 (reference numeral 65), from which it is received by the mobile stations located on the direct mode channel.

In the established telecommunication connection, the mobile stations operating on the direct mode channel receive the speech transmitted by the system, as forwarded by the repeater station, in the time slot 3 of the direct mode channel (reference numeral 66).

The following is a description of the operation of the invention in ending the telecommunication connection. When the system ends the established telecommunication connection by transmitting a notification 67, the repeater station forwards 68 it further to the direct mode channel, on which the mobile stations located on the direct mode channel, after having received 69 it, readapt to the control channel of the system by operating in subsequent telecommunication connections in the manner disclosed in connection with the description of FIG. 5. The repeater station also readapts to the control channel of the system.

The figures and the description relating thereto are merely intended to illustrate the idea of the invention. In their details, the method and the mobile communication system for synchronizing a telecommunication connection according to the invention may vary within the scope of the claims. Even if the invention has been described above mainly in connection with a trunked mobile communication system, the invention can also be used in mobile communication systems of other types.

I claim:

1. A method for synchronizing a telecommunication connection in a mobile communication system, which includes a base station which communicates on system control and traffic channels of the mobile communication system, uplink and downlink frequencies of said system channels being divided into frames including time slots, a direct mode mobile station communicating by transmission on a single frequency direct mode channel divided into frames including time slots, said direct mode mobile station being arranged to synchronize its transmission with a basic synchronization converging with a synchronization of a downlink frame of a system control channel of said base station, and a direct mode relay repeater which communicates with said direct mode mobile station communicating on the direct mode channel and with said base station, said method comprising:

said direct mode mobile station communicating with at least one other direct mode mobile station on said single frequency direct mode channel;

said direct mode relay repeater receiving a connection set-up request for establishing a telecommunication connection between said direct mode mobile station communicating on said direct mode channel and said mobile communication system;

said direct mode relay repeater receiving, from said mobile communication system over said system control channel, traffic channel information concerning on which of said traffic channels of said mobile communication system said telecommunication connection to be established must be established, as an allocated traffic channel;

said direct mode relay repeater notifying said direct mode mobile station on said direct mode channel, based on said traffic channel information, of synchronization information concerning an adaptive synchronization to be used over said telecommunication connection to be established on said direct mode channel; and said direct mode mobile station shifting a starting moment of a frame of its own direct mode channel transmission in relation to a starting moment according to said basic synchronization in accordance with said adaptive synchronization indicated in the synchronization information sent to said direct mode mobile station by the direct mode relay repeater.

2. A method according to claim 1, wherein:

said shifting is conducted such that said direct mode mobile station transmits according to said adaptive synchronization in such a manner that a frame of adaptive synchronization is shifted to start at a desired time slot of a frame of said basic synchronization.

3. A method according to claim 2, wherein:

said shifting is conducted such that said direct mode mobile station transmits according to said adaptive synchronization in such a manner that a frame of said adaptive synchronization is shifted to start in relation to said basic synchronization in such a manner that a first time slot of said adaptive synchronization is simultaneous with an uplink time slot of said traffic channel allocated to said telecommunication connection.

4. A method according to claim 1, wherein:

said shifting is conducted such that said direct mode mobile station transmits according to said adaptive synchronization in such a manner that a frame of said adaptive synchronization is shifted to start in relation to said basic synchronization in such a manner that a first time slot of said adaptive synchronization is simultaneous with an uplink time slot of said traffic channel allocated to said telecommunication connection.

5. A method according to claim 1, wherein:

said shifting is conducted such that direct mode mobile station transmits according to said adaptive synchronization in such a manner that a frame of said adaptive synchronization is shifted to start in relation to the basic synchronization in such a manner that the frame of said adaptive synchronization is simultaneous with a downlink frame of said control channel of said base station.

6. A method according to claim 1, wherein:

said notifying includes said direct mode relay repeater changing the synchronization of the frame of said direct mode mobile station operating on said direct mode channel by transmitting synchronization information to said direct mode mobile station indicating a location of a frame of said adaptive synchronization in relation to a frame of said basic synchronization, in time domain.

7. A method according to claim 1, wherein:
in said receiving a connection set-up request, said direct mode relay repeater receives said connection setup request from said base station.

8. A method according to claim 1, wherein:
in said receiving a connection set-up request, said direct mode relay repeater receives said connection set-up request from said direct mode mobile station communicating on said direct mode channel.

9. A mobile communication system, comprising:
at least one base station arranged to communicate on system control and traffic channels of the mobile communication system, said system channels having uplink and downlink frequencies which are divided into frames including time slots;
at least one direct mode mobile station arranged to communicate by transmission on a single frequency direct mode channel divided into frames including time slots, each of said at least one direct mode mobile station being arranged to synchronize its respective transmission with a basic synchronization converging with the synchronization of the system control channel of a respective said base station;
a direct mode relay repeater, arranged to communicate with said at least one mobile station on said direct mode channel and with said at least one base station on said system channels, said direct mode relay repeater comprising:
 a first receiver unit for receiving radio messages from said at least one base station and said system channels;
 a second, direct mode, receiver unit for receiving radio messages from said at least one direct mode mobile station communicating on said direct mode channel;
 a control unit for controlling operation of said direct mode relay repeater; and
 at least one transmitter unit for transmitting radio messages in response to commands given by said control unit selectively at least to said at least one base station on said system channels and to said at least one direct mode mobile station on said direct mode channel;
said direct mode relay repeater being arranged to notify said at least one direct mode mobile station on said direct mode channel, based on traffic channel information allocated to a telecommunication connection to be established, of synchronization information concerning an adaptive synchronization to be used over said telecommunication connection to be established on said direct mode channel, said at least one direct mode mobile station being arranged to shift, in response to said synchronization information, a starting moment of its respective own direct mode channel transmission in relation to a starting moment according to said synchronization information.

10. A mobile communication system according to claim 9, wherein:
said direct mode relay repeater comprises means for transmitting said synchronization information to said at least one direct mode mobile station operating on said direct mode channel, said synchronization information indicating said adaptive synchronization to be used on said telecommunication connection.

11. A direct mode mobile station communicating by transmission on a single frequency direct mode channel divided into frames including time slots, said direct mode mobile station being arranged to synchronize a starting moment of a frame of said direct mode channel transmission with a basic synchronization converging with a synchronization of a control channel of a base station, said direct mode mobile station comprising:
a memory;
a transceiver, which is arranged to transmit and receive on said direct mode channel to and from at least one other direct mode mobile station without monitoring system channels;
a control unit for controlling an operation of the direct mode mobile station;
said direct mode mobile station being arranged to shift, in response to synchronization information, obtained from a direct mode relay repeater monitoring said system channels, a starting moment of a frame of said direct mode channel transmission of said direct mode mobile station in relation to a starting moment according to said basic synchronization, in accordance with an adaptive synchronization indicated in synchronization information sent to said direct mode mobile station by the direct mode relay repeater.

12. A direct mode mobile station according to claim 11, wherein:
said direct mode mobile station is arranged to store in said memory said synchronization information obtained from the direct mode relay repeater, said synchronization information indicating a starting moment of a frame according to said adaptive synchronization in comparison with a starting moment of a frame according to said basic synchronization.

13. A direct mode mobile station according to claim 11, wherein:
said direct mode mobile station is arranged to store in said memory said synchronization information received from the direct mode relay repeater, said synchronization information indicating a starting moment of a frame according to said adaptive synchronization in comparison with a starting moment of a frame according to said basic synchronization.

14. A direct mode relay repeater which is arranged to communicate with direct mode mobile stations communicating on a single frequency direct mode channel and with a base station of a mobile communication system on system control and traffic channels having uplink and downlink frequencies, said direct mode relay repeater station comprising:
a first receiver unit for receiving radio messages on said system channels from said base station;
a second, direct mode receiver unit for receiving radio messages from the direct mode mobile stations on said direct mode channel;
a control unit for controlling operation of said direct mode relay repeater;
at least one transmitter unit for transmitting radio messages in response to commands given by said control unit selectively at least to said base station on said system channels and to a respective one of said direct mode mobile stations on the direct mode channel;
said direct mode repeater station being arranged to notify said one of said direct mode mobile stations communicating on the direct mode channel, based on traffic channel information allocated to a telecommunication connection to be established, of synchronization information concerning an adaptive synchronization to be used over said telecommunication connection on said direct mode channel, for causing said one of said direct mode mobile stations to shift, in response to said synchronization information, a starting moment of a direct mode channel transmission of said one of said direct mode mobile stations in accordance with said adaptive synchronization indicated in said synchronization information sent to said one of said direct mode mobile stations by said direct mode relay repeater.

15. A direct mode relay repeater according to claim 14, wherein:

said at least one transmitter unit includes means for transmitting said synchronization information to the respective one of said direct mode mobile stations operating on the direct mode channel, said synchronization information indicating said adaptive synchronization to be used on said telecommunication connection.

16. A method for synchronizing a telecommunication connection in a mobile communication system, which includes a base station which communicates on system control and traffic channels of the mobile communication system, uplink and downlink frequencies of said system channels being divided into frames including time slots, a direct mode mobile station communicating by transmission on a single frequency direct mode channel divided into frames containing time slots, said direct mode mobile station being arranged to synchronize a transmission of said direct mode mobile station with a basic synchronization converging with a synchronization of a downlink frame of a system control channel of said base station, and a direct mode relay repeater which communicates with said direct mode mobile station communicating on the direct mode channel and with said base station on said system control and traffic channels, said method comprising:

said direct mode mobile station communicating with at least one other direct mode mobile station on said single frequency direct mode channel;

said direct mode relay repeater receiving a connection set-up request for establishing a telecommunication connection between said direct mode mobile station communicating on said direct mode channel and said mobile communication system;

said direct mode relay repeater receiving from said mobile communication system, over said system control channel, traffic channel information concerning on which system traffic channel of said mobile communication system said telecommunication connection to be established must be established, as an allocated traffic channel;

said direct mode relay repeater notifying said direct mode mobile station on said direct mode channel, based on said traffic channel information, of synchronization information concerning an adaptive synchronization to be used over said telecommunication connection to be established on said direct mode channel; and said direct mode mobile station shifting a starting moment of a frame of a direct mode channel transmission of said direct mode mobile station in relation to a starting moment according to said basic synchronization in accordance with said adaptive synchronization indicated in the synchronization information sent to said direct mode mobile station by the direct mode relay repeater, so that a first time slot of each direct mode channel frame is aligned with an uplink time slot of said allocated traffic channel.

17. A mobile communication system comprising:

at least one base station arranged to communicate on system control and traffic channels of the mobile communication system, said system channels having uplink and downlink frequencies which are divided into frames containing time slots;

at least one direct mode mobile station arranged to communicate by transmission on a single frequency direct mode channel divided into frames containing time slots, each of said at least one direct mode mobile station being arranged to synchronize its respective transmission with a basic synchronization converging with a synchronization of a control channel of a respective one of said at least one base station;

a direct mode relay repeater, arranged to communicate with said at least one direct mobile station on said direct mode channel and with said at least one base station on said system channels, said direct mode relay repeater comprising:

a first receiver unit for receiving radio messages from said at least one base station on said system channels;

a second, direct mode, receiver unit for receiving radio messages from said at least one direct mode mobile station on said direct mode channel;

a control unit for controlling operation of said direct mode relay repeater; and at least one transmitter unit for transmitting radio messages in response to commands given by said control unit selectively at least to said at least one base station on said system channels and to said at least one direct mode mobile station on said direct mode channel;

said direct mode relay repeater being arranged to notify said at least one direct mode mobile station on said direct mode channel, based on traffic channel information allocated to a telecommunication connection to be established, of synchronization information concerning an adaptive synchronization to be used over said telecommunication connection to be established on said direct mode channel, said at least one direct mode mobile station being arranged to shift, in response to said synchronization information, a starting moment of its respective own direct mode channel transmission in relation to a starting moment according to said synchronization information so that a first time slot of each direct mode channel frame is aligned with an uplink time slot of said allocated traffic channel, said second receiver unit of said direct mode repeater being arranged to receive said direct mode channel transmission of said at least one direct mode mobile station in said first time slot of a respective current direct mode channel frame and said transmitter of said direct mode repeater being arranged to simultaneously retransmit a direct mode channel transmission, receive in said first time slot of respective previous direct mode channel frame, to said mobile communications system in said uplink time slot of said allocated traffic channel.

18. A direct mode relay repeater arranged to communicate with direct mode mobile stations communicating on a single frequency direct mode channel and with a base station of a mobile communication system on system control and traffic channels having uplink and downlink frequencies, said direct mode relay repeater comprising:

a first receiver unit for receiving radio messages on said system channels from said base station;

a second, direct mode receiver unit for receiving radio messages from the direct mode mobile stations on said direct mode channel;

a control unit for controlling operation of said direct mode relay repeater; and at least one transmitter unit for transmitting radio messages in response to commands given by said control unit selectively at least to said base station on said system channels and to a respective one of said direct mode mobile stations on the direct mode channel;

said direct mode repeater being arranged to notify said direct mode mobile stations on the direct mode channel, based on traffic channel information allocated to a telecommunication connection to be established, of synchronization information concerning an adaptive synchronization to be used over said telecommunication connection on said direct mode channel, for causing said direct mode mobile stations to shift, in response to said synchronization information, the starting moment of its own direct mode channel transmission in accordance with said adaptive synchronization indicated in said synchronization information sent to said direct mode mobile stations by said direct mode relay repeater, so that a first time slot of each direct mode channel frame is aligned with an uplink time slot of said allocated traffic channel, said second receiver unit of said direct mode repeater being arranged to receive said direct mode channel transmission of said direct mode mobile stations in said first time slot of respective current direct mode channel frame and said transmitter of said direct mode repeater being arranged to simultaneously retransmit a direct mode channel transmission, received in said first time slot of respective previous direct mode channel frame, to said mobile communications system in said uplink time slot of said allocated traffic channel.

19. A mobile communication system comprising:

a base station arranged to communicate on system control and traffic channels of said mobile communication system, uplink and downlink frequencies of said system channels being divided into frames including time slots;

a direct mode mobile station arranged to communicate by transmission on a single frequency direct mode channel divided into frames including time slots, said direct mode mobile station being arranged to synchronize its transmission with a basic synchronization converging with a synchronization of a downlink frame of a system control channel of said base station; and a direct mode relay repeater arranged to communicate with said direct mode mobile station communicating on said direct mode channel and with said base station on said system control channel and said traffic channel, wherein:

said direct mode mobile station being arranged to communicate with at least one other direct mode mobile station on said single frequency direct mode channel, said direct mode relay repeater being arranged to receive a connection setup request for establishing a telecommunication connection between said direct mode mobile station communicating on said direct mode channel and said mobile communication system, said direct mode relay repeater being arranged to receive from said mobile communication system, over said system control channel, traffic channel information concerning on which system traffic channel of said mobile communication system said telecommunication connection to be established must be established, as an allocated traffic channel;

said direct mode relay repeater being arranged to notify said direct mode mobile station on said direct mode channel, based on said traffic channel information, of synchronization information concerning an adaptive synchronization to be used over said telecommunication connection to be established on said direct mode channel;

said direct mode mobile station being arranged to shift a starting moment of a frame of its own direct mode channel transmission in relation to a starting moment according to a basic synchronization in accordance with said adaptive synchronization indicated in the synchronization information sent to said direct mode mobile station by the direct mode relay repeater, so that a first time slot of each direct mode channel frame is aligned with an uplink time slot of said allocated traffic channel; and said direct mode repeater receiving said direct mode channel transmission of said direct mode mobile station and retransmitting said received transmission on said system traffic channel to said mobile communications system.

* * * * *